May 26, 1970 W. B. BIGGS 3,514,057
AIRCRAFT RETRACTABLE UNDERCARRIGES
Filed Dec. 14, 1967 3 Sheets-Sheet 1

INVENTOR
WILLIAM B. BIGGS
BY
Christensen, Sanborn + Matthews
ATTORNEYS

May 26, 1970  W. B. BIGGS  3,514,057
AIRCRAFT RETRACTABLE UNDERCARRIGES
Filed Dec. 14, 1967  3 Sheets-Sheet 3

INVENTOR
WILLIAM B. BIGGS
BY
Christnox, Sadou · Matthews
ATTORNEYS

United States Patent Office 3,514,057
Patented May 26, 1970

3,514,057
AIRCRAFT RETRACTABLE UNDERCARRIAGES
William B. Biggs, Cheltenham, England, assignor to Dowty Rotol Limited, Gloucester, England, a British company
Filed Dec. 14, 1967, Ser. No. 690,465
Claims priority, application Great Britain, Dec. 22, 1966, 57,467/66
Int. Cl. B64c 25/18
U.S. Cl. 244—102          6 Claims

ABSTRACT OF THE DISCLOSURE

A pivotally mounted wheel-carrying leg is braced when extended by a foldable strut, the in-line condition of which is maintained by a toggle linkage which is in turn urged to an in-line condition by a spring-loaded telescopic device, wherein the telescopic device includes two pistons which are operated by fluid pressure when retraction is selected, one piston compressing the spring to relieve the toggle linkage of spring load, and the other piston acting to break the toggle and thus to commence folding the strut.

BACKGROUND OF THE INVENTION

Field of the invention

Retractable undercarriages for aircraft

Description of the prior art

Retractable leg mechanism is known having a pair of interconnected drag links pivotally connected between the leg and the aircraft, a pair of lock arms arranged as a toggle linkage between one of the drag links and the aircraft, a spring device acting to urge the lock arms towards the locked position in which they are in line, a fluid actuator operable to fold the lock arms during retraction, and another fluid actuator which is connected to one of the drag links and which is operable thereon to cause retraction of the leg.

SUMMARY OF THE INVENTION

According to the invention an aircraft undercarriage comprises a wheel-carrying leg provided with a retraction pivot about which the leg turns between an extended position and a retracted position, a folding strut consisting of two elements pivoted respectively on the leg and on the aircraft, and having a hinged joint one with the other about which said elements fold from a substantially in-line position when the leg is retracted, a toggle linkage connected to the folding strut and arranged when in line to maintain the elements of the strut substantially in line, power-operated retraction means connected to the leg, and a telescopic device connected to the toggle linkage, the telescopic device including spring means acting, when the leg is lowered to its extended position to straighten the toggle linkage and thus to straighten the folding strut, and also including a first member operable by fluid pressure, when retraction is selected to compress the spring means whereby the toggle linkage is relieved of spring load, and a second member operable by fluid pressure, when retraction is selected, to break the toggle and thus to commence folding the strut whereby retraction of the leg is commenced.

DESCRIPTION OF THE PREFERRED EMBODIMENT

Figure 1:
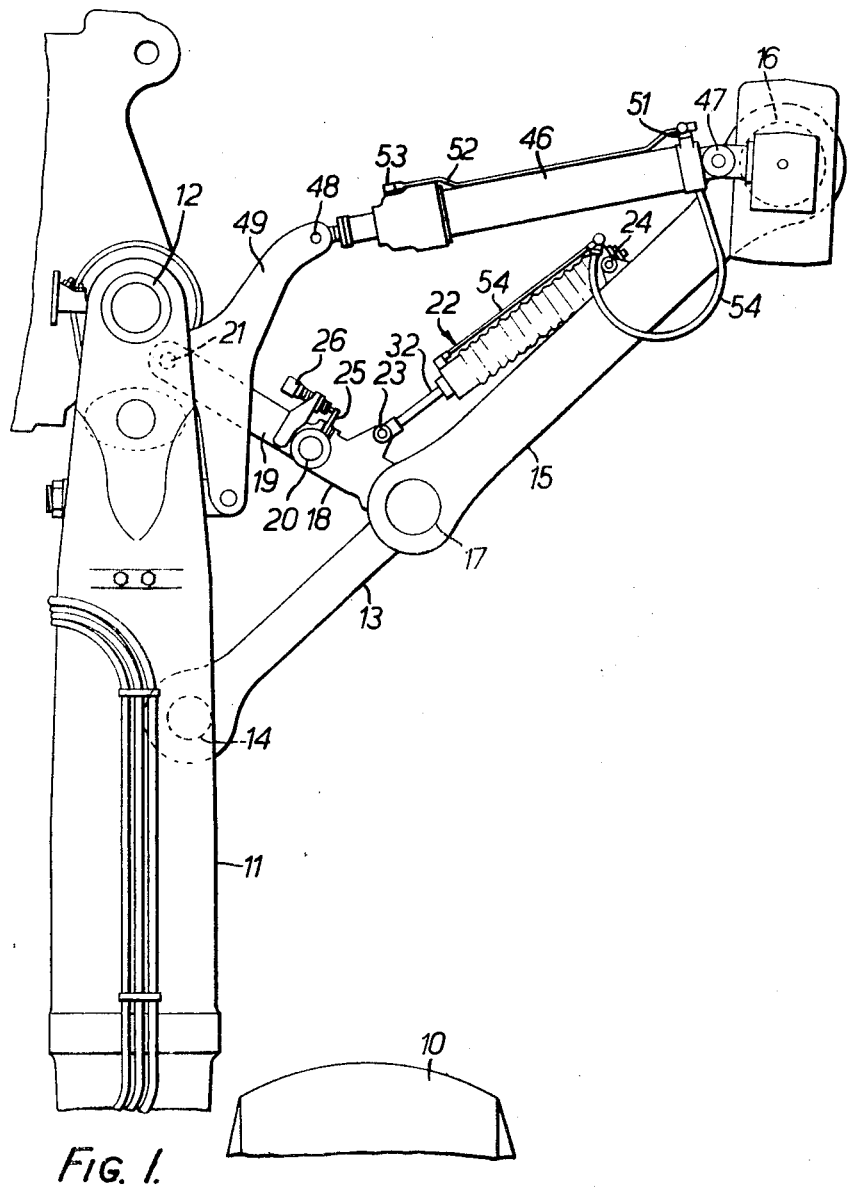
FIG. 1 is a front elevation of the upper portion of an aircraft retractable undercarriage in the extended position.

In FIG. 1, the upper part 11 of a shock-absorbing leg is shown with a retraction pivot 12 which has a fore and aft axis for sideways retraction. The upper part of one of a pair of wheels 10 is seen, these wheels having a common rotational axis which is perpendicular to a vertical plane containing the retraction pivot axis. The leg, when in the extended position is braced by a folding strut which consists of an element 13 pivoted to the leg at 14, and an element 15 pivoted to the aircraft at 16, these elements having a hinged joint 17 one with the other. The folding strut 13, 15 is held in line by toggle links 18, 19 interposed between the hinged joint 17 and a pivot 21 which is fixed in the leg 11 near to the retraction pivot 12. The toggle links 18, 19 have a pivotal connection 20.

The toggle links 18, 19 have cooperating pads at 25 which determine a stable relationship of the links which is slightly beyond a strictly in-line relationship of the pivots 17, 20, 21. A limit switch 26 provides an indication to the pilot of the aircraft when the toggle linkage is stable.

A retraction jack 46 operates between a pivot 47 which is fixed in the aircraft, and a pivot 48 on a retraction arm 49 which is fixed to the upper part of the leg 11.

A telescopic device 22 is interposed between a pivot 23 on the link 18 and a pivot 24 on the strut element 15. The device 22 FIG. 3, comprises a cylinder member 27 having a bore 28 in which an annular piston member 29 is slidable. An inner piston member comprises a piston 31 which is slidable in the bore of the annular piston, and a piston rod 32 which is connected to the pivot 23. The piston rod 32 extends slidably through an end cap 33 fixed to the cylinder 27. A supply passage 34 for operating fluid is formed in the end cap 33 and it opens into a chamber 35 in which fluid pressure can act on both the annular piston 29 and the inner piston 31. The annular piston 29 is loaded towards the end cap 33 by a spring 36 which surrounds the cylinder 27 and which abuts the flanged end of a slidable sleeve 37. The end portion of the sleeve 37 remote from the flange is formed with fingers 38 which extend through longitudinal slots 39 in the intermediate portion of the cylinder 27 to engage an annular abutment 41 on the annular piston 29.

The end of the annular piston 29 remote from the chamber 35 receives a central screw-threaded pin 42 which forms a preset stop engageable by the central piston 31. When there is no fluid pressure supplied to the chamber 35 and the spring 36 holds the sleeve 37 against the end cap 33, the pin 42 is adjusted to engage the piston 31, the position of the latter being determined by the stable substantially in-line relationship of the toggle links 18, 19. A chamber 43 formed between the annular piston 29 and the piston 31 on the side of the latter opposite to the piston rod 32, is vented by a central passage 44 in the pin 42.

The jack 46 is extended by hydraulic pressure at a connector 51, and contracted by hydraulic pressure through a pipe 52 to a connector 53 at the other end of the jack. A pipe 54 leading to the supply passage 34 and chamber 35 in the telescopic device 22, is joined to the connector 51 so that the device 22 is urged by fluid pressure to contract at the same time as the jack 46 is urged to extend, i.e. for retraction of the leg 11. When fluid pressure is applied to the connector 53 to contract the jack 46, i.e. for extension of the leg 11, there is only low pressure at the connector 51 and in the pipe 54.

Figure 2:
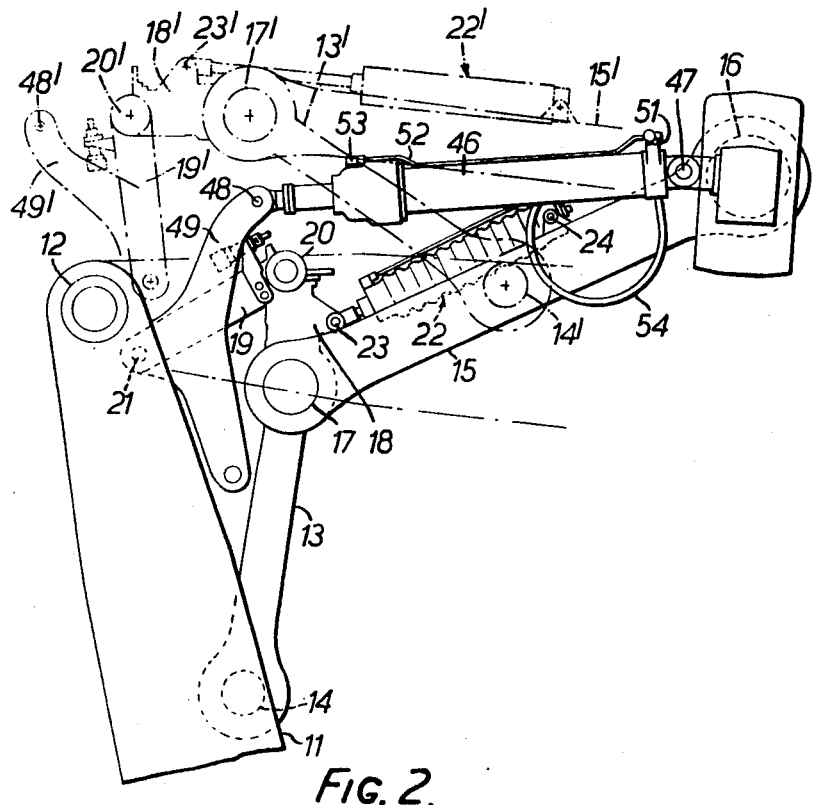
FIG. 2 is a similar view showing the undercarriage partly retracted.

When retraction is selected, the jack 46 is urged to extend, but since the axis of the jack 46 passes close to the retraction pivot 12, the jack 46 can only exert a low initial retraction torque. At the same time the annular piston 29 of the telescopic device 22 is urged outwardly by fluid pressure and in so doing compresses the spring 36 up to a limit determined by engagement of the slidable sleeve 37 against a fixed sleeve 40 supported at the other end of the cylinder member 27. Fluid pressure on the piston 31 also causes the piston rod 32 to withdraw into the cylinder member 27, see FIG. 4, thus breaking the toggle linkage, 18, 19 from its stable substantially in-line position. With the piston 31 in the position shown in FIG. 4, the toggle links 18, 19 are mutually inclined as shown in FIG. 2, thus shortening the distance between the pivots 17 and 21 and starting to fold the strut elements 13, 15 about their common pivot 17. The piston 31 has up to this position broken the in-line position of the strut elements 13, 15 and has thus assisted the retraction jack 46 in turning the leg 11 to the position shown. The telescopic device 22 is then at minimum length and cannot further assist retraction, but the axis of the jack 46 is now further off-set from the retraction pivot, so that the jack 46 continues to raise the leg 11.

During an intermediate stage of retraction, the device remains substantially at its minimum length between the pivots 23 and 24 and it therefore has no appreciable influence on the retraction of the leg 11.

Figure 3:
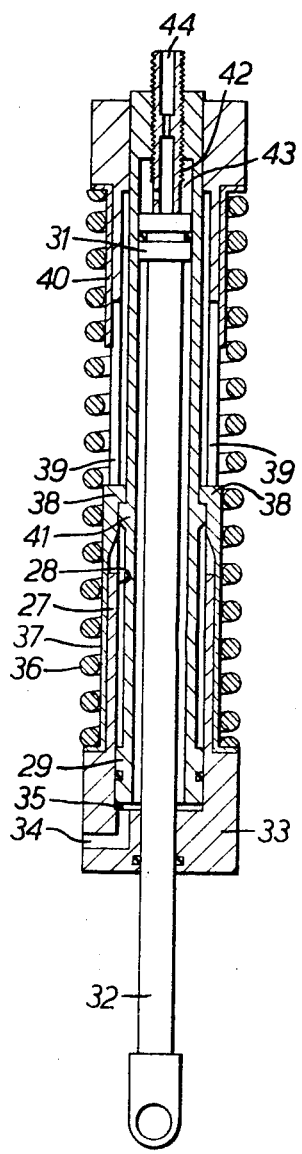
FIG. 3 is a diagrammatic view shown in longitudinal section of a telescopic device which forms part of the undercarriage.
Figure 4:
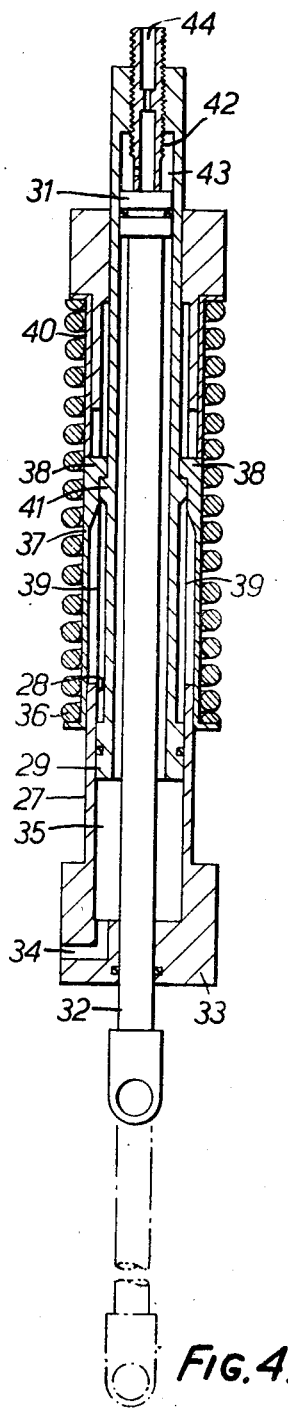
FIG. 4 is a similar view of the telescopic device showing its parts in different relative positions.

In the final stage of retraction, the piston rod 32 extends from the cylinder 27 to a position beyond that of FIG. 3, as shown in chain line in FIG. 4, thus expelling fluid pressure from the chamber 35 through the passage 34, and the pipe 22. During this stage the turning moment exerted by the jack 46 is sufficient to complete retraction of the leg and to overcome the resistance caused by fluid pressure acting on the annular area of the piston 31. The retracted position of the leg and actuating parts are shown in chain line in FIG. 2 with a suffix applied to each reference numeral.

The undercarriage is locked in this position in any usual manner, not shown, and when so locked fluid pressure is released from the jack connector 51 and from the pipe 54 and chamber 35 of the telescopic device 22. The annular piston 29 therefore returns under the load of the spring 36 until the slidable sleeve 37 engages the abutment formed by the end cap 33. The piston rod 32 remains extended to a maximum from the cylinder 27 so that the piston 31 is axially spaced from the stop pin.

Figure 5:
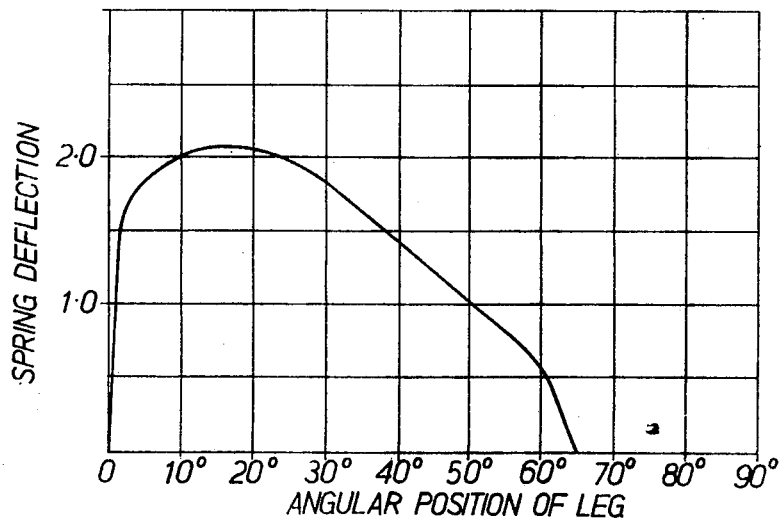
FIG. 5 is a graph relating the deflection of a spring in the telescopic device to the position of the undercarriage.

To lower the undercarriage, the retraction lock is released and the jack 46 is retracted by fluid pressure. There is no fluid pressure in the supply passage 34 and chamber 35, so that the piston rod 32 moves freely into the cylinder 27 until the piston 31 engages the stop pin 42. This occurs as seen in the graph of FIG. 5 when the angular position of the leg 11 is approximately 65° from the vertical. Thereafter the spring 36 is progressively compressed until maximum spring deflection occurs at an angular position of the leg which is approximately 15° from the vertical. From then on the spring starts to extend gradually and it is seen that the greater part of the spring extension occurs in the final degree of movemet of the leg to the vertical. The spring therefore acts with substantial force to urge the toggle links 18, 19 to the stable substantially in-line position, and to urge the strut members 13, 15 to a substantially in-line relationship.

The arrangement and construction of the telescopic device 22 provides a fail-safe condition in the event of failure of fluid power. If the retraction lock is released, the leg 11 will fall under its own weight, and the turning moment will be sufficient to cause compression of the spring 36. The final extension movement of the leg 11 is assured by the spring 36 which acts with considerable mechanical advantage in the last degree of movement to urge the toggle links to the stable position in which they prevent the strut elements 13, 15 from collapsing under any sideways loads which may occur on the leg.

I claim:

1. An aircraft undercarriage comprising:
   (a) a wheel-carrying leg provided with a retraction pivot about which the leg turns between an extended position and a retracted position,
   (b) a folding strut consisting of
      (1) one element pivotally connected to the leg,
      (2) another element pivotally connected to the aircraft, and
      (3) a hinged joint between the elements about which said elements fold from a substantially in-line position when the leg is retracted,
   (c) a toggle linkage connected to the folding strut and arranged when in line to maintain the elements of the strut substantially in line,
   (d) power-operated retraction means connected to the leg,
   (e) and a telescopic device connected to the toggle linkage and including,
      (1) spring means acting, when the leg is lowered to its extended position, to straighten the toggle linkage and thus to straighten the folding strut,
      (2) an annular piston slidably mounted in a cylinder member of the telescopic device, said annular piston being operable by fluid pressure, when retraction is selected, to compress the spring means whereby the toggle linkage is relieved of spring load, and
      (3) a piston which is slidable in the annular piston and which is connected by a rod to the toggle linkage, the piston being movable by fluid pressure in the same direction as the annular piston, when retraction is selected, to break the toggle and thus to commence folding the strut whereby retraction of the leg is commenced, and being movable with respect to the annular piston and against the action of fluid pressure during a subsequent stage of retraction movement.

2. An aircraft undercarriage according to claim 1, wherein the spring means comprises a coil spring which surrounds the cylinder member and which is connected to the annular piston by a load-carrying member extending through longitudinal slots in the cylinder member.

3. An aircraft undercarriage according to claim 1, wherein the cylinder member is connected to one of the strut elements.

4. An aircraft undercarriage comprising
   (a) a wheel-carrying leg provided with a retraction pivot about which the leg turns between an extended position and a retracted position,
   (b) a folding strut consisting of
      (1) one element pivotally connected to the leg,
      (2) another element pivotally connected to the aircraft, and
      (3) a hinged joint between the elements about which said elements fold from a substantially in-line position when the leg is retracted,
   (c) a toggle linkage connected to the folding strut and arranged when in line to maintain the elements of the strut substantially in line,
   (d) power-operated retraction means connected to the leg,
   (e) and a telescopic device connected beweetn a pivot on the toggle linkage and a pivot on one of the strut elements, these pivots being so arranged that during retraction of the leg the telescopic device first contracts from a pre-determined length and then extends to a length which exceeds the predetermined length, and the telescopic device including
      (1) spring means acting, when the leg is lowered to its extended condition, to straighten the toggle linkage and thus to straighten the folding strut,
      (2) a first fluid-operable member associated with the spring means and operable by fluid pressure, when retraction is selected, to compress the spring means whereby the toggle linkage is relieved of spring load, and (3) a second fluid-operable member which provides the connection of the telescopic device to the toggle linkage, said second fluid-operable member being slidably mounted with respect to the first fluid-operable member, and being operable when retraction is selected first to contract in the telescopic device under the application of fluid pressure and so to break the toggle linkage and then to extend slidably with respect to the first fluid-operable member.

5. An aircraft undercarriage comprising:
(a) a wheel-carrying leg adapted to turn about a retraction bearing in the aircraft,
(b) a folding strut connected between the leg and the aircraft and,
(c) a toggle linkage connected to the folding strut such that when the undercarriage is extended, both the folding strut and the toggle linkage are in their respective in-line positions,
(d) power-operated retraction means connected to the leg, and
(e) a telescopic device operable on the toggle linkage and so arranged that, during retraction of the leg, the telescopic device first contracts from a predetermined length and then extends to a length which exceeds the predetermined length, said device including
   (1) a cylinder member
   (2) a stop member which is loaded towards an abutment on the cylinder member by spring means, and,
   (3) a piston member connected to the toggle linkage, the piston member being engaged by the stop member and the stop member engaging the abutment under spring load, when the leg is extended, whereby the toggle linkage is maintained in line, the piston member being movable by fluid pressure, when retraction is selected to break the toggle linkage and, as retraction proceeds, to return past its initial position and in so doing to separate from the stop member.

6. An aircraft undercarriage according to claim 5, wherein the telescopic device is contracted by the toggle linkage so as to compress the spring means during the greater part of the angle through which the leg turns when lowered from the retracted position, the subsequent extension of the spring then acting to straighten the toggle linkage, and hence the folding strut, whereby the final turning movement of the leg to its extended position is assured.

References Cited
UNITED STATES PATENTS

| | | | |
|---|---|---|---|
| 2,630,990 | 3/1953 | Kanode et al. | 244—102 |
| 2,811,137 | 10/1957 | Hartel | 92—27 |
| 2,826,381 | 3/1958 | Cruz | 244—102 |
| 2,939,655 | 6/1960 | Hartel | 244—102 |

MILTON BUCHLER, Primary Examiner

P. E. SAUBERGER, Assistant Examiner

U.S. Cl. X.R.
267—64; 92—51